(12) United States Patent
Pinney

(10) Patent No.: US 8,508,782 B2
(45) Date of Patent: Aug. 13, 2013

(54) METHOD OF SECURING PRINTERS AGAINST MALICIOUS SOFTWARE

(75) Inventor: Shaun Pinney, Fremont, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 244 days.

(21) Appl. No.: 12/977,576

(22) Filed: Dec. 23, 2010

(65) Prior Publication Data
US 2012/0162698 A1      Jun. 28, 2012

(51) Int. Cl.
*G06K 15/00* (2006.01)
*G06F 11/00* (2006.01)

(52) U.S. Cl.
USPC .......... 358/1.16; 358/1.15; 358/1.14; 726/22; 726/23; 726/24; 726/25; 712/243; 712/244; 712/245

(58) Field of Classification Search
USPC .................. 726/17–26; 358/1.15, 1.14, 1.13; 712/243, 244, 225
See application file for complete search history.

(56) References Cited

U.S. PATENT DOCUMENTS

| | | | |
|---|---|---|---|
| 4,442,484 A * | 4/1984 | Childs et al. | 711/163 |
| 5,168,566 A * | 12/1992 | Kuki et al. | 718/103 |
| 7,207,065 B2 | 4/2007 | Chess et al. | |
| 7,660,985 B2 | 2/2010 | Asher et al. | |
| 7,770,031 B2 | 8/2010 | MacKay et al. | |
| 7,934,092 B2 * | 4/2011 | Funk et al. | 713/166 |
| 2005/0177720 A1 * | 8/2005 | Katano | 713/165 |
| 2006/0095895 A1 | 5/2006 | K. | |
| 2008/0222397 A1 | 9/2008 | Wilkerson et al. | |
| 2010/0277536 A1 * | 11/2010 | Funk et al. | 347/14 |

* cited by examiner

*Primary Examiner* — Dennis Dicker
(74) *Attorney, Agent, or Firm* — Buchanan Ingersoll & Rooney PC

(57) ABSTRACT

A method for securing a computer device against malicious code, the method including the steps of: executing a computer program on the computer device, the computer device having a central processing unit, which carries out instructions of the computer program, and wherein at least a portion of the computer program is executed by one or more tasks, each of the one or more tasks having a task stack associated therewith; and managing the central processing unit such that the central processing unit does not execute machine code from the task stacks associated with each of the one or more task so as to secure the computer device against malicious code from the task stack.

19 Claims, 6 Drawing Sheets

Stack Frame

Memory

METHOD OF SECURING PRINTERS AGAINST MALICIOUS SOFTWARE

FIELD OF THE INVENTION

The present invention relates to a method of securing a computer device against malicious software attacks, and more particularly, to a method of securing image forming apparatuses and/or printers against malicious software attacks by preventing malicious instructions and/or code from being executed by a main program code via a stack overflow.

BACKGROUND OF THE INVENTION

Networks have enhanced our ability to communicate and access information by allowing one personal computer to communicate over a network (or network connection) with another personal computer and/or other networking devices, using electronic messages. When transferring an electronic message between personal computers or networking devices, the electronic message will often pass through a protocol stack that performs operations on the data within the electronic message (e.g., packetizing, routing, flow control).

Modern printers, scanners, faxes, and copiers include many security features to prevent against misuse. For example, security features are added to prevent users from making copies of currency, coupons, valuable papers, and other documents. However, in any environment it is occasionally possible for malicious users to use various attacks to bypass security features.

Due to the complexity of software available in complex printers, scanners, fax, and copiers the possibility of stack overflow can be very high. The impact of a successful attack can also be damaging as it may allow secure data to be viewed and manipulated by unauthorized users. To prevent against this class of security issue, it would be desirable to implement a method of preventing malicious code from being executed by a malicious user due to a stack overflow condition via a stack overflow attack.

It can be appreciated that there are many options available to an attacker once a vulnerability has been identified and exploited on an image forming device, such as an all-in-one (AIO), or multifunction printer. Because of this, an exhaustive list of potential security issues is difficult to quantify. However, bypass of known and documented security features is certainly included in the list of security risks.

For example, secure printers have a feature known as confidential print or "ID and Print" where a user can request a print, yet the printer will not begin ejecting sheets until the document owner is physically present at the printer and has successfully authenticated via inputting a correct username/password combination, swipe card, biometric security device or other method. The "ID and Print" security feature prevents unauthorized users from viewing secure printouts when the document owner is not physically present at the printer. However, if an attack is so tailored such that printing begins before the document owner has physically authenticated with the printer, then the security feature is bypassed and unauthorized access to the document becomes possible.

It can also be appreciated that counterfeit protection is an area of concern. Copiers may include counterfeit protection to prevent counterfeiters from making high-quality reproductions of currency, coupons, valuable papers, and other documents. If such a security feature is bypassed due to a successful attack, then high-quality counterfeit copies can be made by unscrupulous users.

In addition, in many image forming apparatuses or printers, data is stored to an internal hard disk as a part of the printing process. To prevent unauthorized users from removing the hard drive and viewing the print jobs of others an encryption can be applied to the print data. However, if an attacker is able to modify the encryption process and store raw data to the hard disk (or copy the raw data before encryption begins) then it may become possible for the attacker to view the secure print, copy, etc. data of others.

Accordingly, for these reasons, and others, it is desirable to include security features, which prevent against bypass or modification of secure processes of image forming apparatuses by preventing execution of code, which is located on the stack to help meet this goal given the security risks.

SUMMARY OF THE INVENTION

In consideration of the above issues, it would be desirable to improve printer, scanner, fax, and copier security by preventing bypass of security features via execution of malicious code inserted during a stack overflow.

In accordance with an exemplary embodiment, a method for securing a computer device against malicious code, comprises: executing a computer program on the computer device, the computer device having a central processing unit, which carries out instructions of the computer program, and wherein at least a portion of the computer program is executed by one or more tasks, each of the one or more tasks having a task stack associated therewith; and managing the central processing unit such that the central processing unit does not execute machine code from the task stacks associated with each of the one or more task so as to secure the computer device against malicious code from the task stack.

In accordance with a further exemplary embodiment, a computer program product comprising a non-transitory computer usable medium having a computer readable code embodied therein for controlling a computer device, the computer readable program code configured to execute a process, the process comprising the steps of: executing a computer program on the computer device, the computer device having a central processing unit, which carries out instructions of the computer program, and wherein at least a portion of the computer program is executed by one or more tasks, each of the one or more tasks having a task stack associated therewith; and managing the central processing unit such that the central processing unit does not execute machine code from the task stacks associated with each of the one or more task so as to secure the computer device against malicious code from the task stack.

In accordance with another exemplary embodiment, a computer device comprises: a central processing unit, which carries out instructions of a computer program, wherein at least a portion of the computer program is executed by one or more tasks, each of the one or more tasks having a task stack associated therewith, and wherein the central processing unit is managed such that the central processing unit does not execute machine code from the task stacks associated with each of the one or more task so as to secure the image forming apparatus against malicious code from the task stack.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
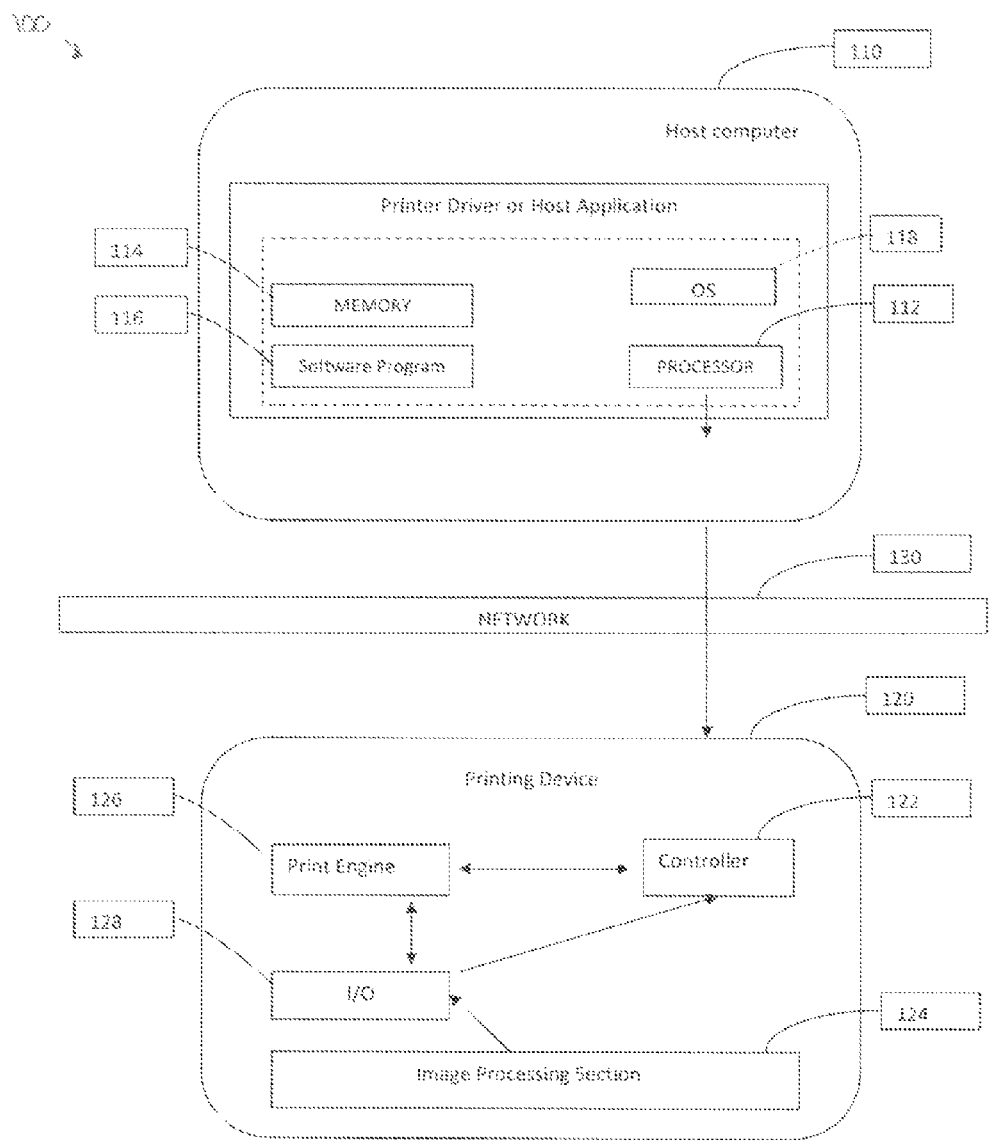
FIG. 1 is an illustration of a data processing system, which includes a computer device and an image forming apparatus or printer connected to the computer device in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is an illustration of a data processing system 100, which includes a computer device 110 (or host device) and an image forming apparatus 120 (or printer) connected to the computer device 110. The computer device 110 preferably includes a processor or central processing unit (CPU) 112, one or more memories 114 for storing software programs 116 and data (such as files to be printed). The computer device 110 also includes an operating system (OS) 118, which manages the computer hardware and provides common services for efficient execution of various software programs 116. The processor or CPU 112 carries out the instructions of a computer program, which operates and/or controls at least a portion of the functionality of the computer device 110. In accordance with an exemplary embodiment, at least a portion of the computer program is executed by one or more tasks, and wherein each of the one or more tasks having a task stack associated therewith. In accordance with an exemplary embodiment, the operating system 118 manages the central processing unit 112, such that the central processing unit 112 does not execute machine code from the task stacks associated with each of the one or more task so as to secure the computer device 110 against malicious code from the task stack. It can be appreciated that examples of computer devices 100 include and are not limited to personal computers, image forming apparatuses, routers, and/or personal digital assistants (PDAs).

It can be appreciated that the method for securing a computer device 110 against malicious code as described herein can also be implemented into an image forming apparatus 120, such as shown in FIG. 1. In accordance with an exemplary embodiment, the image forming apparatus is preferably in the form of a multi-functional printer connected to the computer device 110. The computer device 110 submits print jobs to the image forming apparatus (printer or printing device) 120 by transmitting data representing the documents to be printed and information describing the print job. The image forming apparatus (i.e., printer/printing device) 120 typically includes a controller 122, an image processing section (or data dispatcher) 124, a memory section (not shown) preferably in the form of a hard disk drive (HDD), a print engine 126, and an input/output (I/O) section 128.

The controller 122 includes a central processing unit (CPU), a random access memory (RAM), and a read only memory (ROM). The central processing unit is configured to execute a sequence of stored instructions (i.e., a computer program). It can be appreciated that the controller 122 includes an operating system, which acts as an intermediary between the software programs and hardware components within the image forming apparatus 120. The operating system (or OS) manages the computer hardware and provides common services for efficient execution of various application software. In accordance with an exemplary embodiment, the controller 122 processes the data and job information received from the computer device 110 to generate a print image.

The image processing section 124 carries out image processing under the control of the controller 122, and sends the processed print image data to the print engine 126. The print engine 126 forms an image on a recording sheet based on the image data sent from the image processing section 124. The I/O section performs data transfer with the host computer 110. The controller 122 is programmed to process data and control various other components of the image forming apparatus or printer 120 to carry out the various methods described herein. The hard disk drive (HDD) or storage device stores digital data and/or software programs for recall by the controller 122. In accordance with an exemplary embodiment, the digital data includes resources, which can include graphics/images, logos, form overlays, fonts, etc.

The input/output (I/O) port 128 provides communications between the printer section and the computer device 110 and receives page descriptions (or print data) from the host for processing within the image forming apparatus 120. In accordance with an exemplary embodiment, the operation of printer section commences when it receives a page description from the computer device 110 via I/O port 128 in the form of a print job data stream. The page description may be any kind of page description languages (PDLs), such as PostScript® (PS), Printer Control Language (PCL), Portable Document Format (PDF), XML Paper Specification (XPS), and so on. The computer device 110 and the image forming apparatus (or printer) 120 are preferably connected to one another via a network 130. Examples of the network 130 consistent with embodiments of the invention include, but are not limited to, the Internet, an intranet, a local area network (LAN) and a wide area network (WAN). The image forming apparatus 120 and the computer device 110 can be connected with a wire or be connected with wireless by using radio frequency (RF) and/or infrared (IR) transmission.

Examples of image forming apparatuses 120 consistent with exemplary embodiments of the invention include multifunction printers or peripheral (MFP), a laser beam printer (LBP), an LED printer, a multi-functional laser beam printer including copy function. In accordance with another exemplary embodiment, the image forming apparatus 120 is configured as a multi-function printer or peripheral (MFP) device or all-in-one (AIO) that includes a printer section for converting print data inputted from outside to image data and forming and printing out the converted image onto a printable media, a scanner section for optically reading a document, and a facsimile section for facsimile receiving and transmitting image data to and from external apparatuses through public lines.

Figure 2:
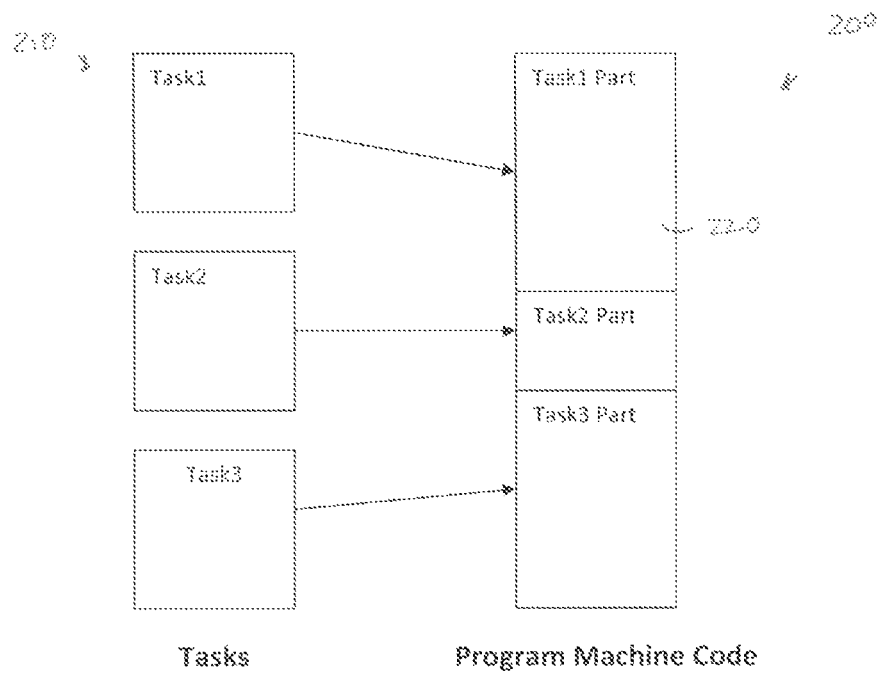
FIG. 2 is an illustration of a plurality of tasks, which form the program machine code of an exemplary device.
Figure 3:
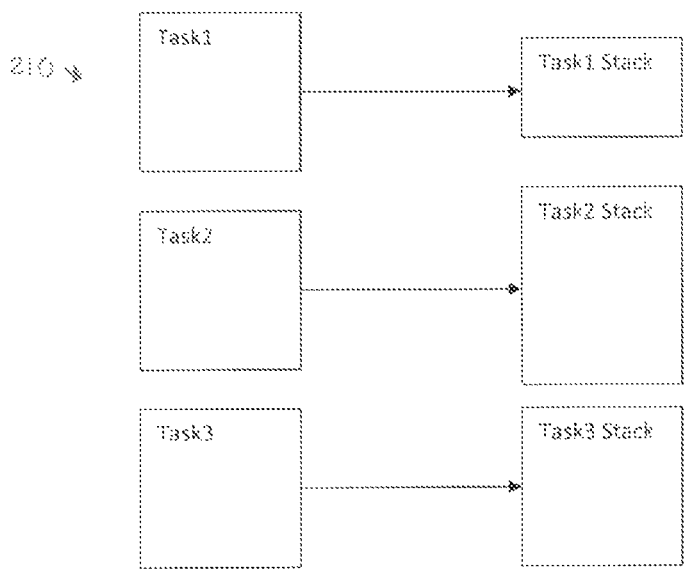
FIG. 3 is an illustration of a plurality of tasks, wherein each task has a memory area (or task stack) associated therewith.
Figure 4:
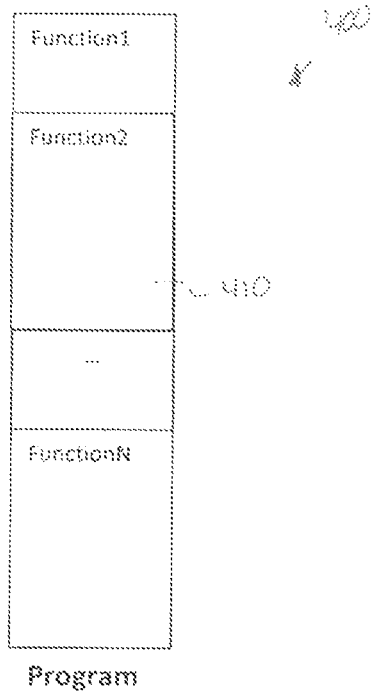
FIG. 4 is an illustration of a structure of a program machine code of an exemplary device, wherein the program machine code is composed of a plurality of functions (or subroutines).

It can be appreciated that in multi-threaded software environments, such as those common inside of computer devices 110, image forming apparatuses 120 and/or modern printers as shown in FIG. 1, a program (i.e., computer program) can be executed by one or more tasks (or threads). Each task 210 executes a portion of the overall program 200, with the performance benefit that independent parts of a program can be run without waiting for unrelated parts 220 (or portions thereof) to complete (FIG. 2). Each task 210 has a memory area called the task stack 310 associated with it, which is used as the task executes program code (FIG. 3). Specifically, the structure of the program code 400 is such that it is composed of many functions (or subroutines) 410, and each function contains machine code, which is executed by the tasks (FIG. 4).

When a task begins executing a function, the task allocates memory from its task Stack. This memory is known as the function's stack frame, and is used to hold temporary data used by the function. In addition, when a task finishes executing a function, it must release the function's stack frame.

Figure 5:
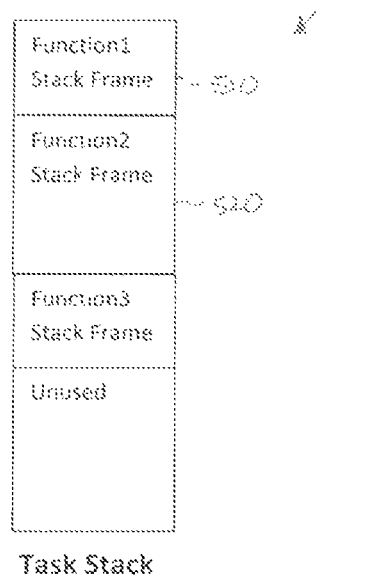
FIG. 5 is an illustration of a stack frame, wherein the task allocates a new stack frame for each function, which is executed in accordance with an exemplary embodiment.

As a function executes, the task can execute machine code, which begins another function 510, this new function can execute machine code, which begins yet another function 520, and so on, and so the task allocates a new stack frame 500 for each function, which is, executed (FIG. 5).

Figure 6:
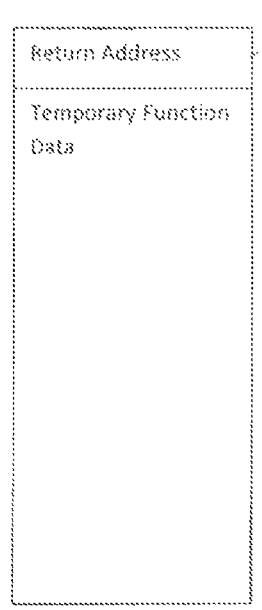
FIG. 6 is an illustration a memory of an exemplary embodiment, wherein the return address is stored in the stack frame.

Now, when a child function is completed, not only must it release its stack frame 600, but it must resume executing where it left off in the parent function, which is the next machine code instruction after the instruction which began the child function. Accordingly, part of a child's stack frame 600 contains the memory address of the next machine code instruction in the parent function. This memory address is known as the function's return address 610 (FIG. 6).

A stack overflow attack involves overwriting a function's stack frame so that when a child function completes, the task does not resume where it left off in the parent function, but at a different address so different instructions are executed rather than the expected instructions in the parent function. During a stack overflow attack, since the attacker can alter the task stack to change the memory address, it is also possible for the attacker to insert malicious machine code instructions on the task stack as well, and change the return address to the start address of the malicious machine code. In this case, when the child function completes, it would begin executing the malicious instructions instead of where it left off in the parent function.

The nature of allowing execution of malicious instructions is that the instructions can be used to alter the system to perform many unintended operations. For example, key areas of concern are the ability to alter the system to bypass code, which performs security features, such as currency detection as well as skipping username and password verification during remote logins.

In a networked environment, it common for developers to create functions which read data which has arrived over the network, store it in memory, and process it in some way, which uses additional memory during processing. In the event the function developers chooses to store the data or the processing results on the task stack, then it is required to reserve a fixed number of bytes on the task stack to hold the data. It then becomes necessary for the function developer to ensure that as data arrives, or as data is processed, that the amount of data written to the task stack is not greater than the reserved amount, otherwise a stack overflow occurs.

It can be appreciated that in large programs with many software parts created by many different companies, it is difficult to detect and prevent against every possible case of stack overflow in the different software parts. Furthermore, due to the complexity of software available in image forming apparatuses, complex printers, scanners, fax, and copiers, the possibility of stack overflow can be very high. Accordingly, the opportunity for stack overflow attacks is often present in image forming apparatuses, printers and the like.

Thus, if a malicious network client knows that by sending certain packets over the network a stack overflow occurs, then the malicious client may be able to craft a special packet in such a way so that malicious instructions are loaded onto the task stack, and also change the return address on the task stack to the location of the malicious instructions. In this way, when the stack overflow occurs, it provides the attacker with a means to execute malicious code without physical access to the printer. It can be appreciated that depending on the nature of the malicious code, there can be many effects, but certainly most are undesirable and can lead to security vulnerabilities and system instability.

In accordance with an exemplary embodiment, to improve upon the situation, many modern microprocessors (or central processing units) contain a Memory Management Unit (MMU), which is capable of preventing tasks from executing instructions from certain memory addresses. In accordance with an exemplary embodiment, to prevent malicious instructions inserted on the task stack from being executed, the MMU is configured such that no area of memory used as a task stack can execute any instructions.

Figure 7:
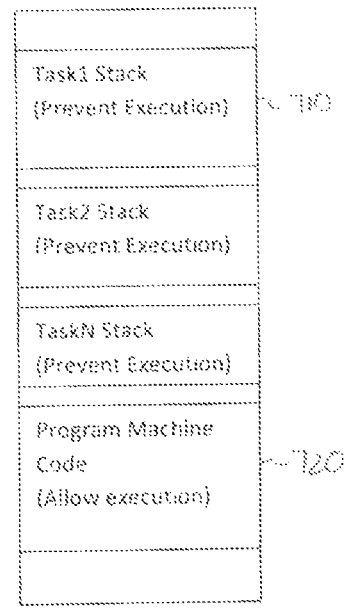
FIG. 7 is an illustration of a program machine code and stack memory layout and permissions in accordance with an exemplary embodiment.

In normal operation, most tasks do not require the ability to execute machine code from the task's stack, and the only executable code is the main program code, which is located in a separate area of memory. It can be appreciated that in accordance with an exemplary embodiment by preventing execution of machine code from the task's stack 710, the image forming apparatus can allow the main program 720 to be executed and at the same time prevent against this type of stack overflow attack 700 (FIG. 7).

Figure 8:
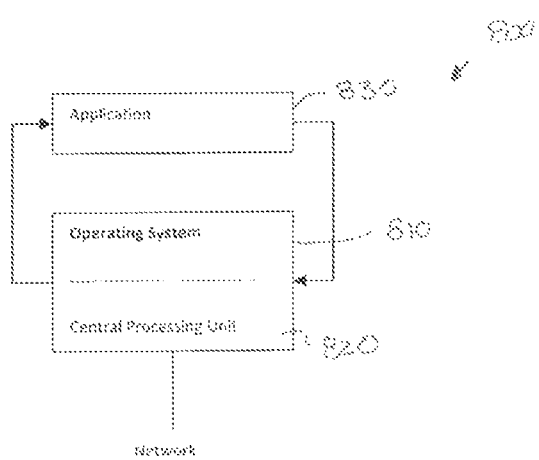
FIG. 8 is an illustration of an operating system and/or a software application, which manages a central processing unit in accordance with an exemplary embodiment.

FIG. 8 is an illustration of an operating system and/or software application (or software module) for managing a central processing unit (or processor) in accordance with an exemplary embodiment. As shown in FIG. 8, a computer device (or host device) 800 includes an operating system (or OS) 810, which acts as an intermediary between the software programs and hardware components within the computer device 800. The operating system 810 preferably manages the computer hardware and provides common services for efficient execution of various application software. In accordance with an exemplary embodiment, the operating system 810 of the computer device 800 is configured to manage the central processing unit (or processor) 820 such that the central processing unit 820 does not execute machine code from the task stacks associated with each of the one or more task so as to secure the computer device 800 against malicious code.

In accordance with an alternative embodiment, a software application (or software module) 830 can be implemented, which filters and/or processes the tasks and/or threads from the task stack, such that the central processing unit 820 does not execute machine code from the task stacks associated with each of the one or more task so as to secure the image forming apparatus against malicious code based on instructions from the software application 830. It can be appreciated that by utilizing a software application 830 as described herein, the operating system 810 of the computer device 800 does not need to be altered or changed in any way.

Figure 9:
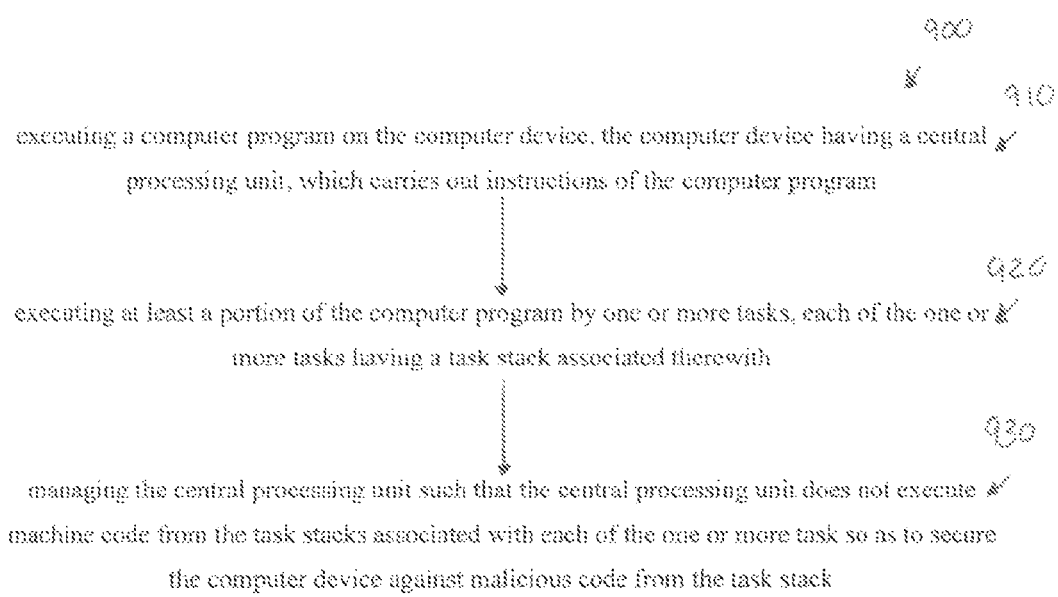
FIG. 9 is an illustration of a flow chart of a method for securing a computer device against malicious code in accordance with another exemplary embodiment

FIG. 9 is an illustration of a flow chart of a method for securing a computer device against malicious code 900 in accordance with an exemplary embodiment. As shown in FIG. 9, the method for securing a computer device against malicious code includes step 910, executing a computer program on the computer device, the computer device having a central processing unit, which carries out instructions of the computer program. In step 920, at least a portion of the computer program is executed by one or more tasks, each of the one or more tasks having a task stack associated therewith. In step 930, the central processing unit is managed such that the central processing unit does not execute machine code from the task stacks associated with each of the one or more task so as to secure the computer device against malicious code from the task stack.

Figure 10:
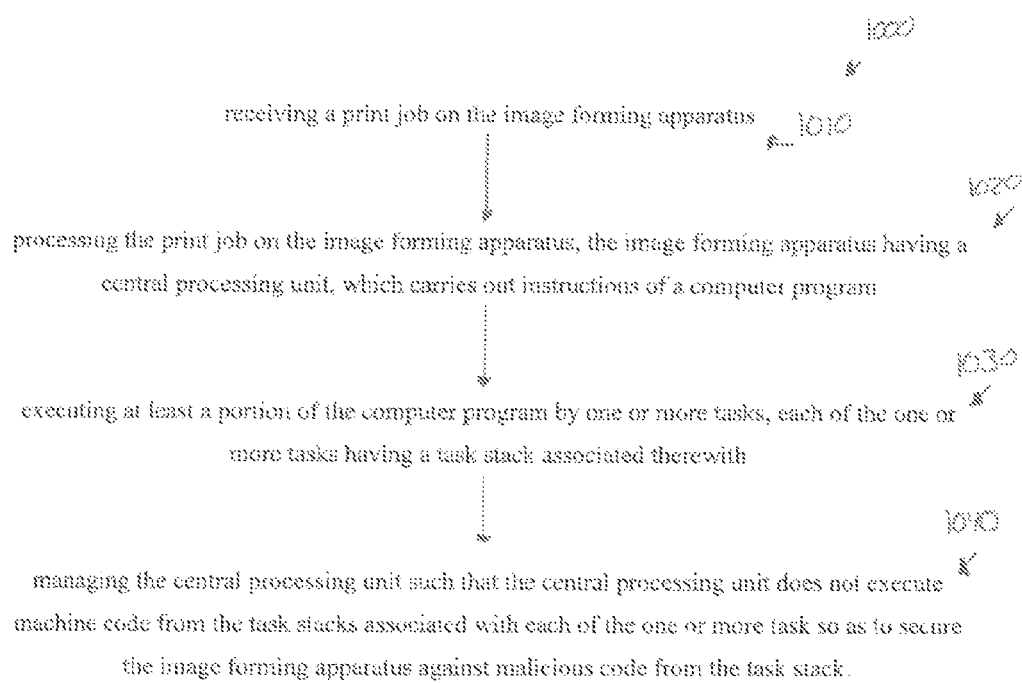
FIG. 10 is an illustration of a flow chart of a method for securing an image forming apparatus against malicious code in accordance with an exemplary embodiment.

FIG. 10 is an illustration of a flow chart of a method for securing an image forming apparatus against malicious code 1000 in accordance with an exemplary embodiment. As shown in FIG. 10, the method for securing an image forming apparatus against malicious code includes step 1010, which comprises receiving a print job on the image forming apparatus. In step 1020, the image processing apparatus processes the print job. The image forming apparatus preferably includes a central processing unit, which carries out instructions of a computer program. In step 1030, at least a portion of the computer program is executed by one or more tasks, each of the one or more tasks having a task stack associated therewith. In step 1040, the central processing unit is managed such that the central processing unit does not execute machine code from the task stacks associated with each of the one or more task so as to secure the image forming apparatus against malicious code.

In accordance with another exemplary embodiment, a computer program product comprising a non-transitory computer usable medium having a computer readable code embodied therein for controlling a computer device. The computer readable program code is configured to execute a process, which includes the steps of: executing a computer program on the computer device, the computer device having a central processing unit, which carries out instructions of the computer program, and wherein at least a portion of the computer program is executed by one or more tasks, each of the one or more tasks having a task stack associated therewith; and managing the central processing unit such that the central processing unit does not execute machine code from the task stacks associated with each of the one or more task so as to secure the computer device against malicious code from the task stack.

In accordance with a further exemplary embodiment, a computer program product comprising a non-transitory computer usable medium having a computer readable code embodied therein for controlling an image forming apparatus. The computer readable program code configured to cause the image forming apparatus to execute a process for producing a print job. In accordance with an exemplary embodiment, the process comprising the steps of: receiving a print job on the image forming apparatus; processing the print job on the image forming apparatus, the image forming apparatus having a central processing unit, which carries out instructions of a computer program, and wherein at least a portion of the computer program is executed by one or more tasks, each of the one or more tasks having a task stack associated therewith; and managing the central processing unit such that the central processing unit does not execute machine code from the task stacks associated with each of the one or more task so as to secure the image forming apparatus against malicious code from the task stack.

The computer usable medium, of course, may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for securing a computer device against malicious code, comprising:
   executing a computer program on the computer device, the computer device having a central processing unit, which carries out instructions of the computer program, and wherein at least a portion of the computer program is executed by one or more tasks, each of the one or more tasks having task stacks associated therewith;
   configuring a Memory Management Unit (MMU) associated with the central processing unit with addresses, which are not executable for each of the task stacks associated with the one or more tasks;
   receiving an executed portion of the computer program from a task stack associated with one of the one or more tasks;
   calculating a next instruction address for the received executed portion of the computer program;
   comparing the next instruction address to the addresses, which are not executable for each of the task stacks associated with the one or more tasks; and
   if the next instruction address is an address, which is not executable, preventing the execution of machine code at the next instruction address of the computer program.

2. The method of claim 1, wherein each of the one or more tasks further comprises one or more functions, and wherein each of the one or more functions contains machine code, which is executed by the one or more tasks.

3. The method of claim 2, wherein upon execution of a function, each of the one or more tasks allocates memory from a corresponding portion of the task stack.

4. The method of claim 1, wherein the step of managing the central processing unit is performed by an operating system of the computer device.

5. The method claim 1, wherein the step of managing the central processing unit is performed by a software application.

6. The method of claim 1, wherein the computer device is an image forming apparatus.

7. The method of claim 6, further comprising the steps of:
receiving a print job on the image forming apparatus; and
processing the print job on the image forming device so as to print the print job on the image forming apparatus.

8. The method of claim 7, wherein the image forming apparatus includes a controller, an image processing section, a memory section, and a print engine, which generates a print image.

9. A computer program product comprising a non-transitory computer usable medium having a computer readable code embodied therein for controlling a computer device, the computer readable program code configured to execute a process, the process comprising the steps of:
executing a computer program on the computer device, the computer device having a central processing unit, which carries out instructions of the computer program, and wherein at least a portion of the computer program is executed by one or more tasks, each of the one or more tasks having task stacks associated therewith;
configuring a Memory Management Unit (MMU) associated with the central processing unit with addresses, which are not executable for each of the task stacks associated with the one or more tasks;
receiving an executed portion of the computer program from a task stack associated with one of the one or more tasks;
calculating a next instruction address for the received executed portion of the computer program;
comparing the next instruction address to the addresses, which are not executable for each of the task stacks associated with the one or more tasks; and
if the next instruction address is an address, which is not executable, preventing the execution of machine code at the next instruction address of the computer program.

10. The computer program product of claim 9, wherein each of the one or more tasks further comprises one or more functions, and wherein each of the one or more functions contains machine code, which is executed by the one or more tasks.

11. The computer program product of claim 10, wherein upon execution of a function, each of the one or more tasks allocates memory from a corresponding portion of the task stack.

12. The computer program product of claim 9, wherein the step of managing the central processing unit is performed by an operating system of the computer device.

13. The computer program product of claim 9, wherein the step of managing the central processing unit is performed by a software application.

14. The computer program product of claim 9, wherein the computer readable program code is configured to cause an image forming apparatus to execute a process for producing a print job, the process further comprising the steps of:
receiving a print job on the image forming apparatus; and
processing the print job on the image forming device so as to print the print job on the image forming apparatus.

15. A computer device comprising:
a central processing unit, which carries out instructions of a computer program, wherein at least a portion of the computer program is executed by one or more tasks, each of the one or more tasks having task stacks associated therewith, and wherein the central processing unit includes a Memory Management Unit (MMU) associated with the central processing unit, the MMU configured with addresses, which are not executable for each of the task stacks associated with the one or more tasks, the central processing unit performing the following steps:
receiving an executed portion of the computer program from a task stack associated with one of the one or more tasks;
calculating a next instruction address for the received executed portion of the computer program;
comparing the next instruction address to the addresses, which are not executable for each of the task stacks associated with the one or more tasks; and
if the next instruction address is an address, which is not executable, preventing the execution of machine code at the next instruction address of the computer program.

16. The computer device of claim 15, wherein each of the one or more tasks further comprises one or more functions, and wherein each of the one or more functions contains machine code, which is executed by the one or more tasks, and upon execution of a function, each of the one or more tasks allocates memory from a corresponding portion of the task stack.

17. The computer device of claim 15, wherein the step of managing the central processing unit is performed by an operating system of the image forming apparatus.

18. The computer device of claim 15, wherein the step of managing the central processing unit is performed by a software application.

19. The computer device of claim 15, wherein the computer device is an image forming apparatus, which includes a controller, an image processing section, a memory section, and a print engine, which generates a print image.

* * * * *